(12) United States Patent
Willis-Papi et al.

(10) Patent No.: US 6,759,505 B2
(45) Date of Patent: Jul. 6, 2004

(54) SINGLE-PHASE OR MULTI-PHASE CONTINUOUS POLYAMIDE POLYMERIZATION PROCESSES

(75) Inventors: Jocelyn Willis-Papi, Kingston (CA); Turget Mutel, Napanee (CA)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 09/966,144

(22) Filed: Sep. 28, 2001

(65) Prior Publication Data

US 2002/0077419 A1 Jun. 20, 2002

Related U.S. Application Data

(60) Provisional application No. 60/237,076, filed on Sep. 30, 2000.

(51) Int. Cl.[7] .................... C08G 69/04; C08G 69/02
(52) U.S. Cl. ............... 528/310; 528/170; 528/312; 528/322; 528/332; 528/335; 528/336; 528/339; 528/340
(58) Field of Search .............. 528/170, 310, 528/312, 322, 332, 335, 336, 339, 340

(56) References Cited

U.S. PATENT DOCUMENTS

| | | | |
|---|---|---|---|
| 4,019,866 A | * 4/1977 | Jaswal et al. .............. 422/132 |
| 4,062,819 A | * 12/1977 | Mains et al. .............. 525/420.5 |
| 4,465,821 A | 8/1984 | Nielinger et al. .......... 528/335 |
| 4,540,772 A | 9/1985 | Pipper et al. ............... 528/335 |
| 4,742,110 A | * 5/1988 | Sakashita et al. .......... 524/538 |
| 4,762,910 A | * 8/1988 | Nielinger et al. .......... 528/339 |
| 4,831,108 A | 5/1989 | Richardson et al. ....... 528/335 |
| 5,098,940 A | 3/1992 | Brooks ...................... 524/227 |
| 5,306,804 A | 4/1994 | Liehr et al. ................ 528/335 |
| 5,447,794 A | * 9/1995 | Lin ........................... 428/373 |
| 5,696,202 A | * 12/1997 | Torre ......................... 524/606 |
| 5,708,125 A | 1/1998 | Liedloff et al. ............ 528/310 |
| 5,981,692 A | * 11/1999 | Leboeuf ..................... 528/332 |
| 6,277,911 B1 | * 8/2001 | Torre ......................... 524/606 |

FOREIGN PATENT DOCUMENTS

JP 07-138366 5/1995

OTHER PUBLICATIONS

Derwent Abstract, of DE 43 29 676 A (EMS Inventa AG) Mar. 10, 1994.

* cited by examiner

Primary Examiner—P. Hampton Hightower

(57) ABSTRACT

There is provided a process for the continuous polymerization of polyamides which is carried out under conditions of pressure, temperature and polymer concentration in water that will ultimately yield multiple phases (including a second liquid polymer phase or a polymer precipitate). However, a single phase operation is achieved under these conditions by appropriate management of residence time and using a well-mixed reaction environment in early stages of the polymerization.

8 Claims, 1 Drawing Sheet

SINGLE-PHASE OR MULTI-PHASE CONTINUOUS POLYAMIDE POLYMERIZATION PROCESSES

This application claims benefit of provisional 60/237,076 filed in Sep. 30, 2000.

FIELD OF THE INVENTION

The present invention relates to a continuous process for the polymerization of polyamides that may be conducted under operating conditions to ultimately yield multiple phases. More particularly, the present invention relates to a controlled process for polyamide formation utilizing less stringent conditions of temperature and pressure otherwise required in conventional, phase-limited processes.

BACKGROUND OF THE INVENTION

Conventional techniques for hydrolytic polymerization of polyamides usually employ an aqueous solution of ingredients. Polymerization is accomplished by the gradual removal of the water from the mixture at elevated pressures by the continuous application of heat (and a subsequent increase in the temperature of the reaction medium). In this manner the majority of the water is removed and the temperature of the reaction medium is above the melting point of the polyamide. The reaction paths—defined as combinations of temperature and pressure conditions either in time for a batch process or at different reaction zones for a continuous process—are chosen in such a way that the reaction mixture is maintained in a liquid phase. This requirement to avoid any liquid-solid phase separation usually implies operating at significantly elevated pressures and correspondingly high temperatures in order to remove the water from the reaction mixture during the early stages of the polymerization, usually in excess of 300 to 400 psig for reaction mixtures containing terephthalic acid, such as PA-6T/66. Furthermore, removal of the remaining water in the later stages of polymerization by gradual reduction of pressure and increasing temperature above the melting point of the polymer requires relatively long times due to heat transfer limitations. One disadvantage of polymerization under these conditions is the resultant high degree of degradation reactions and products which diminishes the usefulness of the final polymer product.

Altogether conventional techniques such as those described above and associated with the polymerization and formation of polyamides have a number of constraints. Of significant interest, the process for conversion of the monomers to low molecular weight polymer is only accomplished by operating at conditions of pressure, temperature and polymer concentration in water corresponding to the single phase region outside the solid polymer melting phase boundary. Moreover, this operating condition must be maintained from beginning to completion of the polymerization. While processes can be based on maintaining operating conditions outside the liquid polymer freezing line during the early molecular mass building stage of polymerization, the region between the liquid polymer freezing line and the solid polymer melting line is then crossed rapidly by aggressively applying energy to the polymerizing medium.

The effect of the occurrence of these types of phases is traditionally considered disadvantageous to sustaining heat transfer efficiency and vessel operating lifetime. To compensate for this effect, those of skilled in the art typically conduct early stage polymerization of polyamide systems based upon terephthalic acid, such as PA-6T/66, at elevated conditions of pressure and temperature so that the reaction proceeds above the solid polymer melting phase boundary. See for example, JP 7138366. Alternatively, two step semi-continuous processes have been employed for the polymerization of these polymers. Such approaches first require the formation of a low molecular weight polymer at high pressures and temperatures and later isolated either in solid or liquid form from the early stages of the polymerization. Further molecular weight build-up is achieved through subsequent processing using operating conditions which allow for rapid heating of the low molecular weight polymer above its melting point in high shear fields and generation of mechanical heat, like twin screw extruders.

However, there are numerous deleterious consequences in choosing to operate at conditions of elevated temperatures and pressure early in the polymerization. Most particularly, high temperatures prompt the early inception of degradation reactions, which have the effect of diminishing the usefulness of the final polymer product. An example is the amidine branching equilibrium associated with polymerization involving aromatic diacids. Further, the influence of pressure on fluid physical properties such as vapour phase density and vapour/liquid interfacial tension may be detrimental to achieving good heat transfer performance. Moreover, such approaches have additional production costs associated with the isolation and re-melt of the oligomer for the two step process, and pose challenges in the handling of powders. Even if the oligomer is kept in molten form there are a number of difficulties in limiting the degradation and contamination of materials, typically associated with oligomer-vapor separation chambers run at excessively high temperatures.

There is a need for a process for the production of polyamides that avoids the longstanding requirement to operate at conditions in which deleterious polymerization side reactions, and with their attendant adverse heat and mass transfer physics, are associated. With such a process, product of enhanced quality will be obtained. Improvements in capital costs and operating productivity are also benefits to such a process.

SUMMARY OF THE INVENTION

A continuous hydrolytic polymerization process for the formation of polyamides or copolyamides is provided, comprising:

(a) polymerizing an aqueous salt mixture of diacids and diamines suitable to form a polyamide or a copolyamide under conditions of temperature and pressure sufficient to ultimately yield a reaction mixture in multiple phases, but for a time sufficient to avoid phase separation;

(b) transferring heat into said reaction mixture while reducing pressure of said reaction mixture sufficient to remove the water therefrom without solidification thereof; and (c) further polymerizing said reaction mixture having the water removed and until a copolymerized product of desired molecular weight is achieved.

The ultimate mixture in step (a) may be in a multi-phase of any of solid, liquid and vapor products. Without intending to limit the generality of the foregoing components of the aqueous salt mixture in (a) above, it is understood by those having skill in the art that terephthalic acid and hexamethylene diamine and at least one of adipic acid or 2-methylpentamethylene diamine (hereinafter "MPMD") are commonly used.

BRIEF DESCRIPTION OF THE DRAWING

The invention will be better understood upon having reference to the drawing herein.

DETAILED DESCRIPTION OF THE INVENTION

Figure 1:
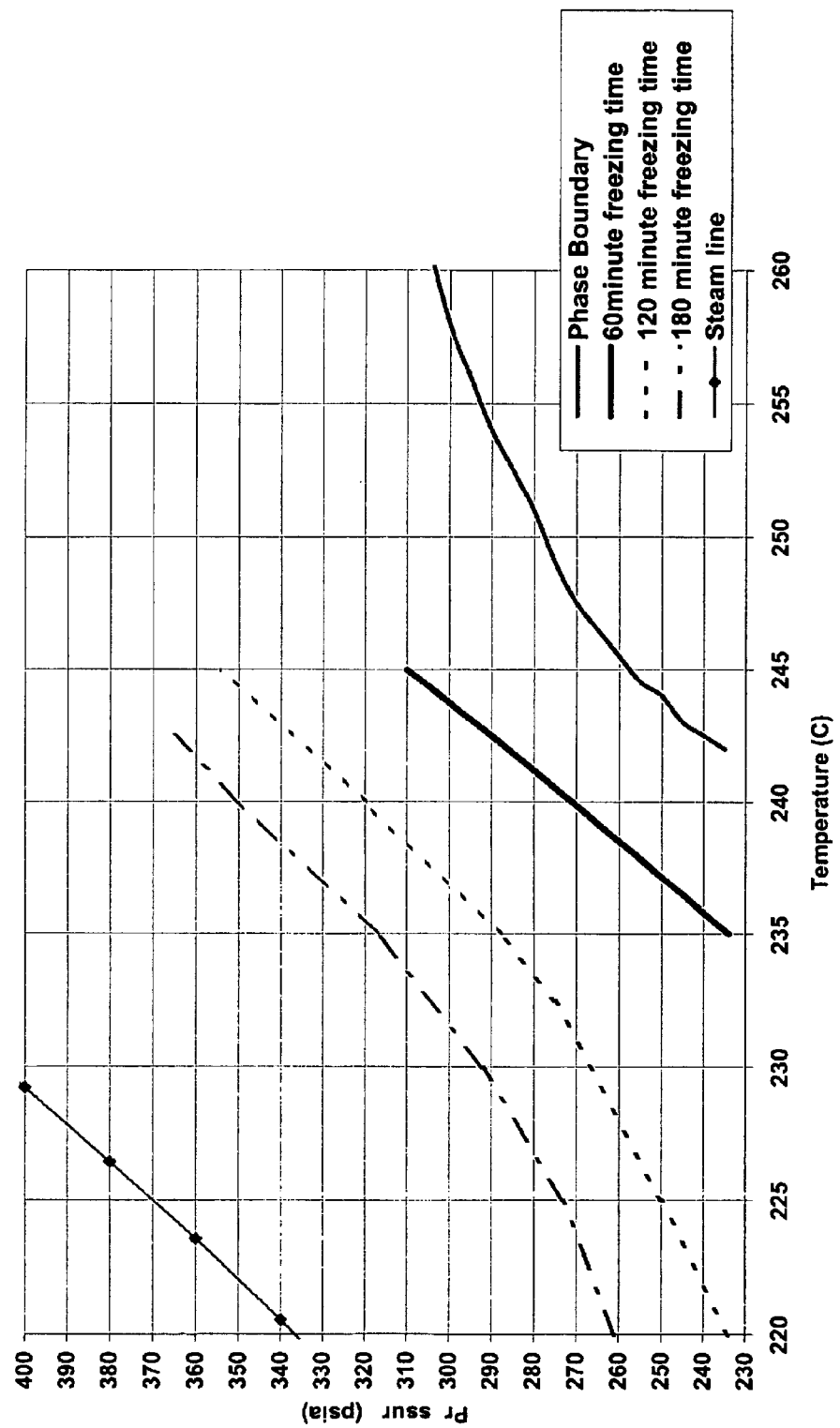
FIG. 1 is a phase diagram which illustrates a number of important features of the invention as detailed further in the Examples herein.

The process in accordance with the invention herein is directed to the continuous hydrolytic polymerization of polyamides. It advantageously employs a well-mixed reaction environment in the early stages of evaporating water and building molecular mass.

The process according to the instant invention employs a three-stage approach. The apparatus used is similar to the apparatus described in U.S. Pat. No. 4,019,866 incorporated by reference herein. However, the process described in this patent would avoid employing conditions in the pre-polymerizer which will ultimately yield a multi-phase mixture. The detrimental effects of such a condition based on the principles of operation of this process will be operational difficulties due to solids build-up and continuity of operation for extended times.

An important attribute of the procedure according to the invention is that it can be used in thermodynamic environments that are susceptible to the formation of either a second liquid polymer phase, or a polymer precipitate. The formation of these types of phases in the reaction vessel is likely to take place slowly in polyamide systems comprised of chains of high inherent solubility in water, PA-66 being such a system. Conversely, the kinetics of the separation of a second liquid phase, or of a precipitate, is likely to be rapid in the case of polymer systems of low inherent solubility in water, PA-6T/66 of high 6T molar proportions being an example of such a system. Here, "PA-6T/66" refers to a random copolymer of polyhexamethyleneterephthalamide and polyhexamethyleneadipamide.

The build up of molecular mass is a function of three reaction conditions: pressure, temperature, and concentration of polymer in water. The early stage of building molecular mass occurs when these conditions lie in the region of a phase diagram for which the formation of either a second liquid phase or a polymer precipitate is assured thermodynamically. The phase diagram is created in a conventional manner by superimposing the solid polymer melting and liquid polymer phase boundaries on pressure versus temperature coordinates, with the parameter of polymer concentration in water.

At these operating conditions, the kinetics of phase separation are such that the formation of the second liquid phase, or of a polymer precipitate, is likely, particularly in the case of a polymer system such as PA-6T/66, of high 6T molar proportion.

In the current invention, the operating conditions for the pre-polymerizer is chosen in the region of delayed phase separation as shown in FIG. 1 and detrimental effects of phase separation is avoided by appropriate choice of the residence time in the vessel. Furthermore, a specific design of the flashing coil is required to remove the remaining water form the reaction mixture exiting the pre-polymerizer and reducing the pressure of the mixture to atmospheric or sub-atmospheric conditions prior to entering the finishing stage without solidification. The flashing coil design incorporates a low pressure drop heating zone operating at pressures higher than 300 psig, followed by a high pressure drop coil design to remove the remaining water. Low pressure drop preheating zone is critical to achieve a profile of temperature and pressure combinations which avoids phase separation prior to the finishing stage.

First, an aqueous mixture of diacids and diamines (typically containing 40 to 70% water by weight) is continuously fed into a pre-polymerizer. The mixture is polymerized up to a degree of polymerization between 4 and 10 under pressure at elevated temperatures. The operating condition of the pre-polymerizer is chosen such that the degradation products are minimized. Under these conditions the solution is not thermodynamically stable and solid-liquid phase separation can occur at certain residence times. The phase separation in the vessel under these conditions is prevented by having a residence time shorter than the time required for the initiation of phase separation. The solution mixture contains approximately 10 to 30% water.

Second, the solution mixture is then continuously pumped out of the prepolymerizer into a heated pipeline reactor (referred as flasher) by means of a positive displacement pump (referred as flasher feed pump). The main function of the flasher is first preheat the reaction mixture under pressure to a temperature at least 30 degrees below the melting point of the polymer and then effectively transfer heat into the solution from a high temperature heat transfer medium, while reducing the pressure of the mixture at a pre-determined rate to allow the removal of the water from the reaction mixture. The pipe diameter along the pipeline reactor is changed in such a way that the pressure and temperature combination at any given point prevents rapid solidification as the water is removed from the mixture. This is accomplished mainly by providing a large diameter reactor in the beginning with low pressure drop to preheat the mixture without significant removal of water, followed by smaller pipe diameters which allow a controlled reduction of the pressure in such a way that the pressure at the flasher feed pump discharge is significantly above the pre-polymerizer pressure to prevent rapid freezing while heating the mixture. The reaction mixture along with the evaporated steam is continuously discharged into an agitated vessel where steam is separated from the stream and vented on top. The liquid is allowed to fall into an agitated melt pool where the polymeric mixture further polymerizes under atmospheric or sub-atmospheric conditions up to the desired molecular weight (typically 13,000 to 20,000 number average molecular weight). One advantage of this process is the minimal time that the polymeric mixture is exposed to high temperatures (typically less than 15 minutes) by optimizing heat transfer at the later stages of the process.

It has been found particularly advantageous, but not restricted to, in the practice of the invention to use a natural circulation thermosyphon. With this device, the residence times in a continuous mode of operation are such that the degree of heat transfer and molecular mass building accomplished at the aforementioned early reaction stage is sufficient for controlled polymerization to the final degree in subsequent stages of the process, but shorter than the times associated with phase separation. Two-phase (vapor-liquid) pipe lines can also be used for this purpose. The main function of this vessel is to boil the majority of the water from the solution under pressure at elevated temperatures and allow sufficient residence time to achieve polymerization under these conditions up to a degree of polymerization between 4 and 10. The steam generated is vented from the top of the vessel and the liquid effluent is pumped out by means of a positive displacement pump. A preferred design configuration allows the vapor to pass through a distillation column. Reflux for the column is provided by a partial condenser on top of the column that is also used to pre-heat the incoming aqueous salt solution.

Operating conditions chosen are usually lower temperatures and pressures compared to incumbent processes. The temperature of the pre-polymerizer is between 225 and 250, preferably 230–240, most preferably 235 and 240 degrees C. The heating medium is typically a condensing high temperature vapor. The temperature of the reaction mixture is measured in the thermosyphon loop by an appropriate temperature measuring device like thermocouples and controlled by manipulating the pressure of the condensing vapor heat transfer medium. The operating pressure is between 210 and 350 psig, preferably between 250 and 320 psig, and most preferably between 265 and 300 psig. The pressure in the vessel is controlled by manipulation of a control valve on the vapor discharge line from the pre-polymerizer.

Under these conditions, the polymeric solution is not thermodynamically stable. Solid-liquid separation occurs if the solution is kept under chosen operating conditions for a period time, leading to a multi-phase system. The inception time for the formation of a multi-phase system is a function of the temperature and pressure, as well as the additives used. Such additives usually include polymerization catalysts (like phosphorous containing known polymerization catalysts) and chain terminators (like benzoic or acetic acid). A weir arrangement can be employed in this vessel to provide a more stable driving force for the thermosyphon operation. Residence time in this vessel can be between 45 minutes to 90 minutes, preferably 60 minutes. The reaction mixture is maintained in a single liquid state by the appropriate choice of residence time with respect to the inception time for phase separation under the chosen conditions. Level control in the pre-polymerizer is achieved by measurement of the level by means of an appropriate level measurement device, typically by a radiation level detector and the level in the vessel is controlled by manipulating the flow of the incoming aqueous salt mixture.

Pre-polymer solution from the pre-polymerizer is pumped into the flasher vessel by means of a positive displacement pump, preferably by a gear pump. The flasher is typically a pipeline reactor composed of different pipe diameters, usually arranged in a single pass trombone style and placed in an outer shell for the heating medium. A typical heating medium is a high temperature condensing vapor and the temperature of the heating medium is controlled by manipulating the pressure of the vapor heating medium. The temperature of the heating medium is typically maintained 10 to 20 degrees C. higher than the melting of the polymer.

The third step in the process is dedicated to final polymerization. The last vessel in the polymerization system is the finishing vessel where the vapor and liquid streams discharged from the flasher are separated and liquid stream is collected in a melt pool in the vessel. The residence time for the liquid is adjusted by the level of the liquid pool in the vessel and typically is between 8 minutes and 12 minutes, preferably 10 minutes to achieve the desired molecular weight for the polymer. The vapor stream separated from the liquid is taken out of the vessel at the top and the pressure in the vessel is controlled by either vacuum jets or a vacuum pump on the vapor exit stream. The pressure in the vessel is controlled typically between 200 mmHg vacuum and atmospheric pressure, preferably 300 to 500 mmHg vacuum. The level in the vessel is measured by an appropriate level detection instrument, typically a radiation level measurement device. The level in the vessel is controlled by manipulating the incoming flow from the flasher. The liquid pool is agitated to achieve a uniform mixture. Typically this is accomplished by employing a ribbon agitator, although any other low shear agitators can be used, for example anchor agitators.

Preferably a single screw extruder type equipment is employed at the bottom of the vessel to generate sufficient suction pressure for a positive displacement pump to pump the liquid polymer out of the vessel. Polymer out of the finisher vessel is delivered to appropriate casting equipment via a heated piping arrangement, where the polymer is extruded into strands, solidified and converted into pellets.

The invention will become better understood upon having reference to the following Examples.

EXAMPLES

Example 1

Several experiments were conducted to record observations relating to isothermal phase separation. In one such experiment, salt solution was heated up and allowed to equilibrate to 240 C. and 250 psia. Phase separation was first detected within 20 minutes of reaching equilibrium conditions. This represents precipitation observed outside the phase diagram and developed non-isothermally.

Furthermore, observations of freezing were noted in several other related experiments. FIG. 1 summarizes the isothermal phase separation data, and in which three lines are indicated on the pressure versus temperature plot and correspond to times of 60, 120, and 180 minutes taken to observe precipitation. These experiments were performed using PA-6T/66 at a mole ratio of 55/45. All salts are in excess of 8.2 pH and have benzoic acid and a conventional polymerization catalyst added, all in the manner known to those having skill in the art.

Experiments were also conducted for PA-66, PA-6T, PA-6T/2 methylpentamethylene diamine, T, PA-6T/66, and PA 6T/612 at compositions ranging from 20% 6T to 65% 6T molar basis. In all cases, isothermal phase separation was observed, at pressures and temperatures to the left of the existing phase diagram (in other words, towards lower temperatures and pressures). This suggests that this concept is applicable to a wide range of condensation polymers.

Example 2

In this example, 50 grams of 40% 6T/66 salt solution were placed into a quartz tube apparatus. The contents were melted and heated until the boiling point was reached, and with vigorous agitation. Pressure was maintained constant at 285 psia, and steam vented off as necessary in order to maintain constant pressure. Water was boiled off gently, and the temperature increased until it reached 235 C. At this point, the agitation was stopped, and the temperature and pressure maintained constant. It is important to note that at 235 C. and 285 psia, the melt is being held at conditions found outside the traditional phase diagram, where homogeneous single phase melt is expected to be maintained. After a suitable period of time, the steam vapour was no longer vented off as required to maintain constant pressure. This indicated that the polyamidation reaction had reached equilibrium. After a total of 80 minutes since constant temperature and constant pressure conditions were reached, particles of phase separated polymer could be seen in the crystal clear melt. As time progressed, the melt transformed from being perfectly clear and transparent to being completely opaque. This indicated that the bulk of the polymer in the quartz tube had solidified.

Example 3

An aqueous salt mixture of equimolar diacids and hexamethylene diamine was prepared at a concentration of 40% by weight at 80 degrees C. The diacids chosen were adipic acid and terepthalic acid at a molar ratio of 45:55 respectively. Into the aqueous mixture 4000 ppm of acetic acid has been added as end-capper and a mixture of 20 ppm sodium hypophosphite and 100 ppm sodium bicarbonate has been added as catalyst. The aqueous mixture was continuously fed into the thermosyphon loop of a pre-polymerizer. The pre-polymerizer thermosyphon was consist of a single tube 8 ft long and 1.375" internal diameter. Pre-polymerizer is 3-inch diameter, 6 foot tall vertical jacketed vessel. A weir arrangement was used to achieve a stable hydrostatic head for the thermosyphon loop. Thermosyphon was heated by electric heaters to supply the necessary heat to boil the excess water in the incoming salt. Prepolymerizer pressure was controlled at 270 pounds per square inch gauge by manipulating the overhead vapor control valve. The temperature of the reaction mixture was kept at 235 degrees C. by manipulating the electrical heat input to the thermosyphon loop. The level in the pre-polymerizer was measured using a radiation type level device and level was controlled by manipulating the incoming aqueous ingredient flow. The residence time in the pre-polymerizer was approximately one hour. Reaction mixture from the polymerizer was pumped into a flashing coil at a rate of approximately 10.5 lb/hr using a gear pump. The flashing coil was 40 feet long of tubing with internal diameters between 0.295 and 0.540 inches. The length and the diameters of the coil is chosen to have a pressure drop greater than 400 pounds per square inch gauge. The flasher coil was heated using electrical heaters and the surface temperature of the tube was controlled at 320 degrees C. Polymer-steam mixture at the exit of the flashing coil has been separated using an atmospheric collection chamber. Polymer obtained at 8 lb/hr has been frozen and analyzed for the reactive ends and melting point. The polymer had 307 to 326 amine ends and 312 to 335 carboxyl ends measured in gram equivalents per million grams of polymer. The number average molecular weight of the polymer was between 3000 and 3400. Melting point of the polymer measured by differential scanning calorimetry was between 300 band 302 degrees C.

Example 4

An aqueous salt mixture of equimolar terephtalic acid and diamines was prepared at a concentration of 40% by weight at 80 degrees C. The diamines chosen were hexamethylene diamine and 2-methylpentamethylene diamine at a molar ratio of 50:50 respectively. Into the aqueous mixture 250 ppm sodium hypophosphite has been added as catalyst. The aqueous mixture has been fed into the pre-polymerizer of the same equipment described in Example 1. The pre-polymerizer pressure was controlled at 270 pounds per square inch gauge and the reaction mixture was kept at 237 degrees C. The flasher coil temperature was controlled at 325 degrees C. The residence time in the polymerizer was maintained at approximately one-hour to keep the mixture in single liquid phase. Pressure drop for the flasher coil was 650 pounds per square inch gauge. The polymer collected from the collection chamber was analyzed for reactive ends and melting point. The polymer had 160 to 200 amine ends and 340 to 370 carboxyl ends measured in gram equivalents per million grams of polymer. The number average molecular weight of the polymer was between 3300 and 3800. Melting point of the polymer measured by differential scanning calorimetry was 300 and 304 degrees C.

Example 5

The same aqueous mixture described in Example 1, with the exception of increased catalyst concentration at 100 ppm sodium hypophosphite and 500 ppm sodium bicarbonate, has been continuously fed into a pre-polymerizer after being pre-heated to 120 degrees C. using a steam-heated coil heater. The pre-polymerizer had a thermosyphon calandria of 12 tubes, each 8 foot long and 1.375 inches internal diameter. Steam leaving the pre-polymerizer has been used as the vapor stream for a 12-tray distillation column to reduce the hexa-methylene diamine concentration in the vapor stream leaving the pre-polymerizer. The aqueous salt mixture was fed into the tube side of a partial condenser for the distillation column to generate reflux stream for the column. Salt mixture leaving the partial condenser at a temperature of 210 degrees C. was fed onto the fifth tray of the distillation column. The bottom liquid stream from the distillation column containing the salt mixture has been continuously fed into the thermosyphon calandria loop. Heat was supplied to the thermosyphon calandria using a condensing high temperature heat transfer vapor. Pre-polymerizer was a jacketed cylindrical vessel 8 inches in diameter and 6 foot tall. The prepolymerizer pressure was controlled at 270 pounds per square inch gauge and the temperature of the reaction mixture was controlled at 235 degrees C. by manipulating the pressure of the condensing heat transfer medium to the thermosyphon calandria. Residence time in the pre-polymerizer was maintained at approximately one-hour to achieve a single liquid phase. The reaction mixture was pumped out of the vessel using a gear pump into a flashing coil. The flashing coil was a single-pass tubular coil designed to achieve a pressure drop in excess of 400 pounds per square inch gauge. The flashing coil was made of pipes with different diameters in the following order; 117 feet of 0.245 inches in diameter, 50 feet of 0.277 inches in diameter, 30 feet of 0.37 inches in diameter and 10 feet of 0.4 inches in diameter. The flashing coil has been heated using a condensing vapor heat transfer medium. The temperature of the heating medium was controlled at 320 degrees C. Polymer/steam mixture from the flashing coil was discharged into a jacket heated agitated finishing vessel. The pressure in the finishing vessel was controlled at 400 mm mercury. The vessel temperature was kept at 320 degrees C. by means of a condensing vapor heat transfer medium. Residence time in the vessel was maintained between 8 and 12 minutes. Polymer was pumped out of the finishing vessel at a rate of 65 lb/hr using a gear pump to a casting machine, cooled by water and pelletized. Polymer made by this equipment was measured to have 65 to 71 gram equivalents per million grams of polymer carboxyl ends and 45 to 59 gram equivalents per million grams of polymer amine ends. The number average molecular weight of the polymer was between 15200 and 17500. The melting point of the polymer was between 302 degrees C. and 304.5 degrees C. as measured by differential scanning calorimetry. The vessel was dismantled and inspected after 8 days of operation and no build-up of solids were found.

Comparative Example 1

An aqueous salt mixture of equimolar diacids and hexamethylene diamine was prepared at a concentration of 40% by weight at 80 degrees C. The diacids chosen were adipic acid and terepthalic acid at a molar ratio of 45:55 respectively. Into the aqueous mixture 6200 ppm of benzoic acid has been added as end-capper and a mixture of 100 ppm sodium hypophosphite and 500 ppm sodium bicarbonate has been added as catalyst. The aqueous salt mixture has been continuously fed into a prepolymerizer after being preheated to 100 degrees C. using a steam-heated coil heater. The pre-polymerizer consist of a 12-tray distillation column to reduce the diamine losses in the vent stream, a partial condenser for the distillation column, a thermosyphon calandria made of 102 tubes of 8 foot in length and 1.375 inches in internal diameter, and a cylindrical polymerization vessel with an internal weir arrangement to provide stable hydrostatic head for the thermosyphon loop. The aqueous salt first has been pre-heated to 100 degrees C. using a steam heated coil arrangement, and fed to the partial condenser for the distillation column to be heated further to 208 degrees C. Salt mixture exiting the partial condenser has been introduced to the fifth tray of the column, which is mixed with the reflux from the partial condenser and collected at the bottom tray to be injected into the thermosyphon loop. Steam boiled-off in the pre-polymerizer enters the distillation column at the bottom tray and vented off at the top of the distillation column. Polymerizer pressure was controlled by manipulating a control valve on the column vent line at 270 pounds per square inch gauge. Polymerizer temperature was controlled by manipulating the pressure of the condensing vapor heat transfer medium supplied to thermosyphon calandria loop and kept at 235 degrees C. Polymeric mixture from the pre-polymerizer containing approximately 17% water was pumped into a flashing coil using a gear pump at approximately 780 lb/hr. Total residence time in the pre-polymerizer was between 120 minutes and 150 minutes, which resulted in a multi-phase polymeric mixture. Flashing coil was a single pass heat exchanger type coil made of pipes with different diameters in the following order; 80 feet of 1.38 inch diameter, 30 feet of 1.05 inch diameter, 240 feet of 0.88 inch diameter, 350 feet of 0.82 inches diameter, 60 feet of 1.05 inches diameter and 120 feet of 1.1 inches in diameter. Flashing coil was placed in a shell where condensing vapor heating media is introduced. The temperature of the condensing vapor was controlled at 320 degrees C. by manipulating the pressure of the vapor heating medium. Polymer/steam mixture exiting the flashing coil has been introduced into a cylindrical, agitated finishing vessel. Vapor stream mainly containing steam has been separated from the liquid polymer stream in the finishing vessel and is vented at the top of the finishing vessel. The pressure of the finishing vessel was controlled between 400 and 650 mm mercury by using vacuum jets on the steam vent stream from the finishing vessel. The temperature of the finishing vessel is maintained at 320 degrees C. by manipulating the pressure of the condensing vapor heating media introduced into the finisher vessel jacket. Liquid polymer is collected into a melt pool in the finishing vessel and the level of the melt pool is measured using a radiation level detector. Liquid level in the finisher was controlled to maintain a residence time approximately 12 minutes. Polymer from the finisher was pumped to a casting device using a gear pump at approximately 650 lb/hr and pelletized by using a strand cutter. The polymer obtained in this manner has been analyzed for reactive ends and melting point. The polymer obtained contained 45 to 62 gram equivalents pre million gram of polymer amine ends and 45 to 78 gram equivalents pre million gram of polymer carboxyl ends. The number average molecular weight of the polymer was between 14200 and 19000. Melting point of the polymer measured by differential scanning calorimetry was between 300 and 304 degrees C.

However, multi-phase polymeric mixture created in the pre-polymerizer due to the longer residence times in the vessel compared to the phase separation time eventually result in a build-up of sufficient solid material in the vessel preventing continued operation beyond eight days limiting the commercial usefulness.

As a result of these large scale studies in Examples 3–5, and Comparative Example 1 a correlation has been identified between run length and the conditions at which the polymerizer was operated. The run length on the polymerizer increases as the ratio between the precipitation time (or phase separation time) and the residence time in the polymerizer increases. The increasing trend suggests that there is an optimum level of precipitate at which polymerizer life will be very long. This corresponds to a residence time in the polymerizer which is shorter than the precipitation time of the polymer. That is, the inventory of polymer melt must be discharged from the polymerizer before significant phase separation occurs.

What is claimed is:

1. A continuous hydrolytic polymerization process for the formation of polyamides or copolyamides comprising:
    (a) polymerizing an aqueous salt mixture of diacids and diamines suitable to form a polyamide or copolyamide at between 225 and 250° C. and pressures and times sufficient to avoid phase separation;
    (b) transferring heat into said reaction mixture while reducing pressure of said reaction mixture to between 200 mmHg and atmospheric pressure; and
    (c) further polymerizing said reaction mixture having the water removed and until a copolymerized product of desired molecular weight is achieved.

2. The process of claim 1 carried out in a natural circulation thermosyphon.

3. The process of claim 1 wherein one of the diacids is terephthalic acid.

4. The process of claim 1 wherein the polyamide is a random copolymer of polyhexamethylene terephthalamide and polyhexamethylene adipamide.

5. The process of claim 1 wherein the polyamide is a random copolymer of polyhexamethylene terephthalamide and 2-methyl-pentamethylene terephthalamide.

6. The process of claim 1 wherein step (b) is achieved using apparatus having a pressure drop sufficient to remove the water from said reaction mixture while transferring heat thereinto without solidification thereof.

7. The process of claim 6 wherein said pressure drop is at least 300 psig.

8. The process of claim 1 wherein the polyamides are selected from polymers and copolymers based upon PA-66 and PA-6T.

* * * * *